(12) United States Patent
Inoue et al.

(10) Patent No.: US 9,202,270 B2
(45) Date of Patent: Dec. 1, 2015

(54) PATTERN INSPECTION APPARATUS AND PATTERN INSPECTION METHOD

(71) Applicant: NuFlare Technology, Inc., Yokohama (JP)

(72) Inventors: Takafumi Inoue, Kanagawa (JP); Hideo Tsuchiya, Tokyo (JP)

(73) Assignee: NuFlare Technology, Inc., Yokohama (JP)

( * ) Notice: Subject to any disclaimer, the term of this patent is extended or adjusted under 35 U.S.C. 154(b) by 0 days.

(21) Appl. No.: 14/255,014

(22) Filed: Apr. 17, 2014

(65) Prior Publication Data

US 2014/0314304 A1    Oct. 23, 2014

(30) Foreign Application Priority Data

Apr. 22, 2013    (JP) .................................. 2013-089308

(51) Int. Cl.
*G06K 9/00*    (2006.01)
*G06T 7/00*    (2006.01)

(52) U.S. Cl.
CPC ....... *G06T 7/001* (2013.01); *G06T 2207/10061* (2013.01); *G06T 2207/20021* (2013.01); *G06T 2207/30141* (2013.01)

(58) Field of Classification Search
CPC ................. G06T 7/0004; G06T 7/001; G06T 2207/3141; G06T 2207/20021; G06T 2207/10061

See application file for complete search history.

(56) References Cited

U.S. PATENT DOCUMENTS

| 4,757,550 | A  | * | 7/1988  | Uga               | 382/148 |
| 6,487,307 | B1 | * | 11/2002 | Hennessey et al.  | 382/149 |
| 7,039,228 | B1 | * | 5/2006  | Pattikonda et al. | 382/145 |
| 2003/0081826 | A1 | * | 5/2003  | Karin et al.   | 382/151 |
| 2009/0041332 | A1 | * | 2/2009  | Bhaskar et al. | 382/145 |

FOREIGN PATENT DOCUMENTS

| JP | 2005-274172 | 10/2005 |
| JP | 4564768     | 10/2010 |

* cited by examiner

*Primary Examiner* — Brian Le
(74) *Attorney, Agent, or Firm* — Oblon, McClelland, Maier & Neustadt, L.L.P.

(57) ABSTRACT

In accordance with one aspect of this invention, a pattern inspection apparatus includes an optical image acquisition unit configured to acquire optical images regarding dies of a target object to be inspected on which the dies having a same pattern formed therein is arranged; a sub-optical image division unit configured to divide an optical image of the optical images regarding a die of the dies positioned in a non-resolved pattern region into sub-optical images using non-resolved pattern region information capable of recognizing the non-resolved pattern region in which a non-resolved pattern that is not resolved is formed; a first comparison unit configured to compare the sub-optical images divided from the optical image of the same die regarding the non-resolved pattern region pixel by pixel; and a second comparison unit configured to compare optical images of the optical images regarding different dies of the dies pixel by pixel.

13 Claims, 12 Drawing Sheets

```
                    Region Information
Cell Region {
    Cell Region 1(x, y, x_length, y_length);
    Cell Region 2(x, y, x_length, y_length);
}, Arrangement Period (x_pitch, y_pitch);

Lead Wire Region {
}

Power Supply Region {
}

Dummy Fill Region {
}
```

FIG. 7

(12) United States Patent

PATTERN INSPECTION APPARATUS AND PATTERN INSPECTION METHOD

CROSS-REFERENCE TO RELATED APPLICATION

This application is based upon and claims the benefit of priority from prior Japanese Patent Application No. 2013-089308 filed on Apr. 22, 2013 in Japan, the entire contents of which are incorporated herein by reference.

BACKGROUND OF THE INVENTION

1. Field of the Invention

Embodiments described herein relate generally to a pattern inspection apparatus and a pattern inspection method. For example, embodiments described herein relate generally to an inspection apparatus and method that inspect a pattern by acquiring an optical image of a pattern image through irradiation of laser light.

2. Related Art

In recent years, with increasingly higher degrees of integration and larger capacities of large-scale integration circuits (LSI), circuit line widths demanded for semiconductor devices become increasingly narrower. Such semiconductor devices are fabricated by exposing and transferring a pattern onto a wafer by step-and-repeat equipment, the so-called stepper, to form a circuit using an original pattern (also called a mask or reticle; hereinafter, collectively called a mask) in which a circuit pattern is formed. Thus, to manufacture a mask for transferring such a fine circuit pattern to a wafer, a pattern writing apparatus capable of writing a fine circuit pattern and using an electron beam is used. By using such a pattern writing apparatus, a pattern circuit may directly be written onto a wafer. Alternatively, the development of a laser beam writing apparatus that writes by using a laser beam, in addition to the electron beam, is attempted.

The improvement of yield is indispensable for manufacturing LSI requiring a large amount of manufacturing costs. However, as is typically shown by DRAM (Random Access Memory) of 1 gigabit or so, patterns constituting LSI are in transition from the order of submicron to that of nanometer. One of the major causes that decrease the yield is a pattern defect of the mask used when a superfine pattern is exposed and transferred onto a semiconductor wafer by photolithography technology. With increasingly finer LSI pattern dimensions formed on the semiconductor wafer in recent years, dimensions that need to be detected as pattern defects are also extremely small. Therefore, a pattern inspection apparatus that inspects for defects of a transfer mask used for manufacturing LSI needs to be made more precise.

On the other hand, with the development of multimedia, the liquid crystal substrate size of LCD (Liquid Crystal Display) increases to 500 mm×600 mm or more and patterns of TFT (Thin Film Transistor) or the like which are formed on a liquid crystal substrate become increasingly finer. Thus, it becomes increasingly demanded to inspect for extremely small pattern defects in a wide range. Therefore, the development of a pattern inspection apparatus that inspects efficiently in a short time patterns of such a large-area LCD and that inspects for defects of a photomask used when a large-area LCD is produced is also urgent.

As an inspection method, a method of conducting an inspection by comparing an optical image obtained by capturing an image of a pattern formed on a target object like a lithography mask in a predetermined magnification by using an magnifying optical system with design data or an optical image obtained by capturing an image of the same pattern on the target object is known. Examples of the pattern inspection method include the "die to die inspection" that compares optical image data obtained by capturing an image of the same pattern in different places on the same mask and the "die to database inspection" in which writing data (design pattern data), which is converted into an apparatus input format used for a writing apparatus to input pattern-designed CAD data when writing a pattern on a mask, is input into an inspection apparatus, and based on the design pattern data, design image data (reference image) is generated to compare the reference image and an optical image to be measured data obtained by capturing an image of a pattern. In such inspection methods in the inspection apparatus, a target object is placed on a stage and an inspection is conducted by scanning the target object with a luminous flux as the stage moves. The target object is irradiated with the luminous flux by a light source and an illumination optical system. Light transmitted through or reflected by the target object forms an image on a sensor via an optical system. The image captured by the sensor is sent to a comparator as measured data. After images are aligned, the comparator compares the measured data and reference data according to an appropriate algorithm and determines that there is a pattern defect if the measured data and the reference data do not match.

When patterns become still finer in the future, an inspection apparatus that inspects cell portions including fine patterns of less than the resolution limit that are difficult to resolve by deep ultra-violet (DUV) light and a corresponding optical system will be needed. On the other hand, an inspection of pattern defects in a size that can sufficiently be resolved is simultaneously needed. Unfortunately, in the related art there has been such a problem that there exists neither apparatus nor method that can adequately be used for both of an inspection of fine patterns of less than the resolution limit and an inspection of pattern defects in a size that can sufficiently be resolved in accordance with precision.

As a technology related to an inspection apparatus that inspects cell portions, a technology using both of a cell comparison inspection that compares cells including a pattern in a size that can sufficiently be resolved and the aforementioned die to die inspection is disclosed (see Published Unexamined Japanese Patent Application No. 2005-274172, for example). However, it is difficult for such an inspection apparatus to inspect fine patterns of cell portions of less than the resolution limit.

As described above, there has been such a problem that there exists neither apparatus nor method that can adequately be used for both of an inspection of fine patterns of less than the resolution limit and an inspection of pattern defects in a size that can sufficiently be resolved. However, a satisfactory technique capable of solving such a problem has not been established.

BRIEF SUMMARY OF THE INVENTION

In accordance with one aspect of this invention, a pattern inspection apparatus includes:

an optical image acquisition unit configured to acquire a plurality of optical images regarding a plurality of dies of a target object to be inspected on which the plurality of dies having a same pattern formed therein is arranged;

a sub-optical image division unit configured to divide an optical image of the plurality of optical images regarding a die of the plurality of dies positioned in a non-resolved pattern region into a plurality of sub-optical images using non-resolved pattern region information capable of recognizing the non-resolved pattern region in which a non-resolved pattern that is not resolved is formed;

a first comparison unit configured to compare the plurality of sub-optical images divided from the optical image of the same die regarding the non-resolved pattern region pixel by pixel; and a second comparison unit configured to compare optical images of the plurality of optical images regarding different dies of the plurality of dies pixel by pixel.

In accordance with other aspects of the invention, a pattern inspection method includes:

acquiring a plurality of optical images regarding a plurality of dies of a target object to be inspected on which the plurality of dies having a same pattern formed therein is arranged;

dividing an optical image of the plurality of optical images regarding a die of the plurality of dies positioned in a non-resolved pattern region into a plurality of sub-optical images using non-resolved pattern region information capable of recognizing the non-resolved pattern region in which a non-resolved pattern that is not resolved is formed;

comparing the plurality of sub-optical images divided from the optical images of the same die regarding the non-resolved pattern region pixel by pixel; and comparing optical images of the plurality of optical images regarding different dies of the plurality of dies pixel by pixel.

In accordance with a further aspects of the invention, a pattern inspection method includes:

acquiring a stripe region image for each of a plurality of stripe regions obtained by virtually dividing an inspection region of a target object to be inspected on which a plurality of dies having a same pattern formed therein is arranged in a thin rectangular shape so as to extend over the plurality of dies;

dividing the stripe region image into a plurality of frame images in a predetermined size;

identifying a non-resolved pattern region for each of the plurality of frame images using non-resolved pattern region information capable of recognizing the non-resolved pattern region in which a non-resolved pattern that is not resolved is formed;

dividing, among the plurality of frame images, a frame image in which the non-resolved pattern region is identified into a plurality of subframe images;

comparing the plurality of subframe images divided from the same frame image pixel by pixel;

aligning frame images of the plurality of frame images regarding different dies of the plurality of dies; and comparing the frame images aligned regarding the different dies pixel by pixel.

BRIEF DESCRIPTION OF THE DRAWINGS

FIG. 7 is a diagram showing an example of non-resolved pattern region information including text data in Embodiment 1;

DETAILED DESCRIPTION OF THE INVENTION

In the embodiments described below, an inspection apparatus and method capable of conducting an inspection of fine patterns of less than the resolution limit and an inspection of pattern defects in a size that can sufficiently be resolved will be described.

Embodiment 1

Figure 1:
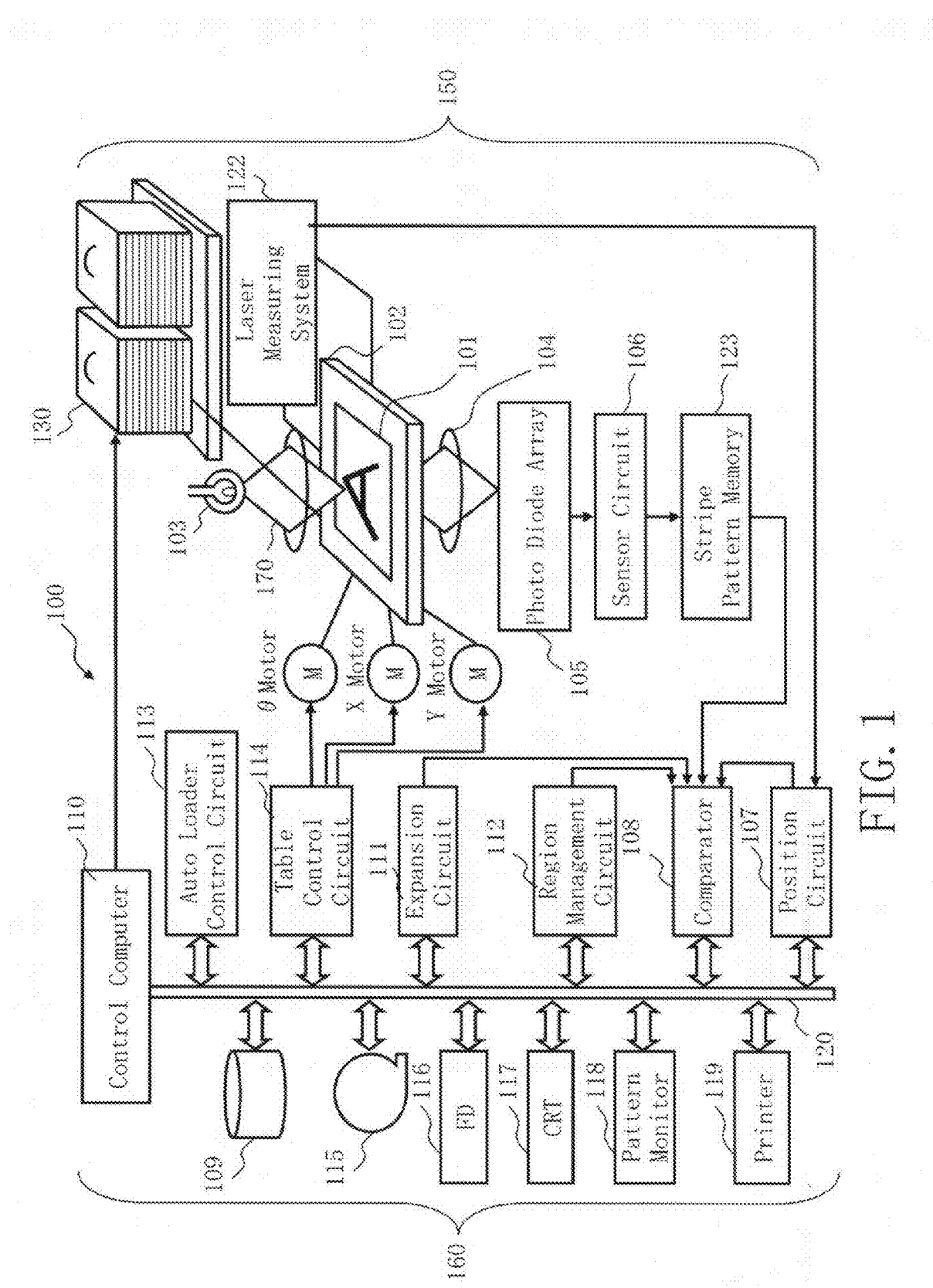
FIG. 1 is a schematic diagram showing a configuration of a pattern inspection apparatus according to Embodiment 1.

FIG. 1 is a schematic diagram showing a configuration of a pattern inspection apparatus according to Embodiment 1. In FIG. 1, an inspection apparatus 100 that inspects for defects of a pattern formed on a target object, for example, a mask includes an optical image acquisition unit 150 and a control system circuit 160 (control unit).

The optical image acquisition unit 150 includes a light source 103, an illumination optical system 170, an XYθ table 102 arranged movably, a magnifying optical system 104, a photo diode array 105 (an example of a sensor), a sensor circuit 106, a stripe pattern memory 123, and a laser measuring system 122. A target object 101 is placed on the XYθ table 102. The target object 101 includes, for example, a photomask for exposure that transfers a pattern to a wafer. The photomask has a pattern including a plurality of figures to be an inspection target formed therein. The target object 101 is placed on the XYθ table 102, for example, with the pattern formation surface directed downward.

In the control system circuit 160, a control computer 110 to be a computer is connected to a position circuit 107, a comparator 108, an reference image generation circuit 111, a region management circuit 112, an auto loader control circuit 113, a table control circuit 114, a magnetic disk drive 109, a magnetic tape drive 115, a flexible disk drive (FD) 116, a CRT 117, a pattern monitor 118, and a printer 119 via a bus 120. In addition, a sensor circuit 106 is connected to a stripe pattern memory 123 and the stripe pattern memory 123 is connected to the comparator 108. The XYθ table 102 is driven by an X-axis motor, a Y-axis motor, and a θ-axis motor. The XYθ table 102 is an example of a stage.

In the inspection apparatus 100, an inspection optical system of high magnification is constituted by the light source 103, the XYθ table 102, the illumination optical system 170, the magnifying optical system 104, the photo diode array 105, and the sensor circuit 106. In addition, the XYθ table 102 is driven by the table control circuit 114 under the control of the control computer 110. The XYθ table 102 is made movable by a driving system like a 3-axis (X-Y-θ) motor driving in the X direction, the Y direction, and the θ direction. For example, step motors can be used as these X motor, Y motor, and θ motor. The XYθ table 102 is movable in the horizontal direction and the rotation direction by the motor of each of the XYθ axes. Then, the movement position of the XYθ table 102 is measured by the laser measuring system 122 and supplied to the position circuit 107.

In FIG. 1, a portion of the configuration needed to describe Embodiment 1 is shown. It is needless to say that other configurations that are normally needed for the inspection apparatus 100 may be included.

Figure 2:
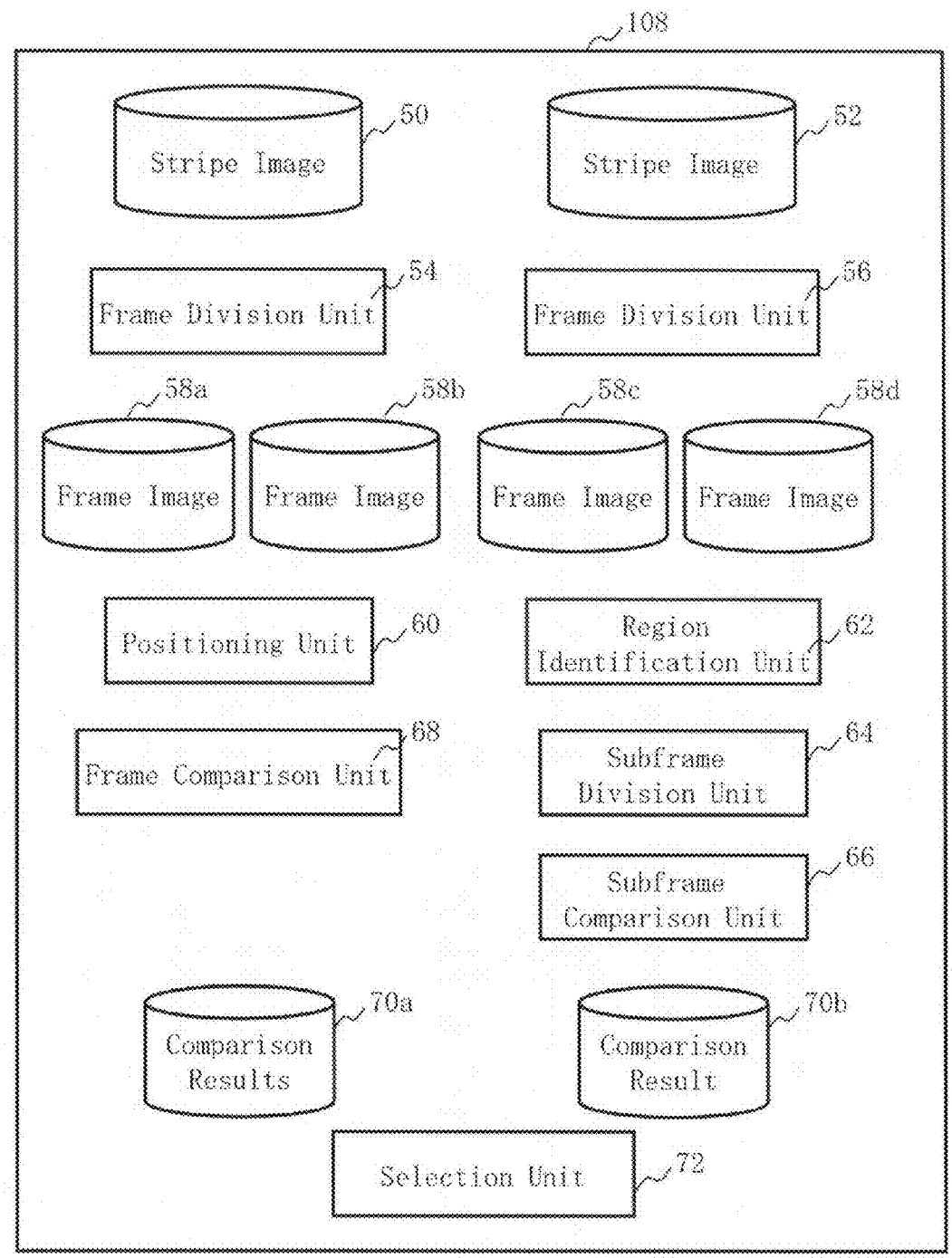
FIG. 2 is a diagram showing an internal configuration of a comparator according to Embodiment 1.

FIG. 2 is a diagram showing an internal configuration of a comparator according to Embodiment 1. In FIG. 2, memories 50, 52, 58, 70, frame division units 54, 56, a positioning unit 60, a region identification unit 62, a subframe division unit 64, a subframe comparison unit 66, a frame comparison unit 68, and a selection unit 72 are arranged inside the comparator 108. Functions such as the frame division units 54, 56, the positioning unit 60, the region identification unit 62, the subframe division unit 64, the subframe comparison unit 66, the frame comparison unit 68, and the selection unit 72 may also be configured by software such as programs. Alternatively, such functions may be configured by hardware such as electronic circuits. Alternatively, software and hardware may be combined. Input data needed for the comparator 108 or operation results is each time stored in the memories 50, 52, 58, 70 or in other memories (not shown).

Figure 3:
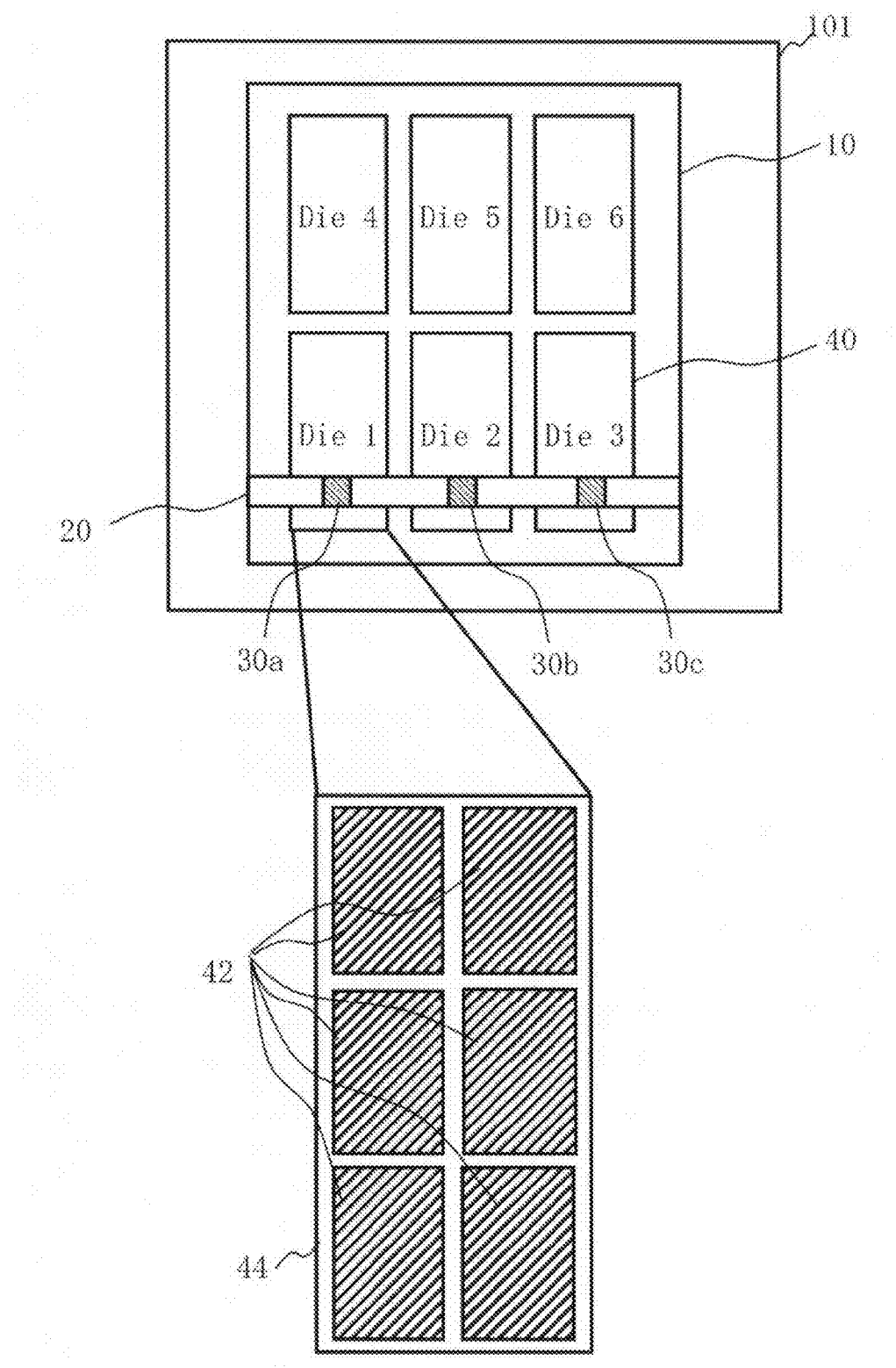
FIG. 3 is a conceptual diagram illustrating a pattern and a scan region on a target object in Embodiment 1.

FIG. 3 is a conceptual diagram illustrating a pattern and a scan region on a target object in Embodiment 1. In FIG. 3, a plurality of dies 40 (chips) in which the same pattern is formed is formed inside an inspection region 10 of the target object 101. In the example of FIG. 3, a total of the six dies 40, three columns in the horizontal direction (x direction) and two rows in the vertical direction (y direction), are arranged. In each of the dies 40, a total of six cell regions 42, two columns in the horizontal direction (x direction) and three rows in the vertical direction (y direction), and a peripheral regions around a plurality of the cell regions 42 are arranged. Inside the cell region 42, a plurality of figure patterns in a size of less than the resolution limit of the inspection apparatus 100, for example, 80 nm or less is arranged. For example, line & space patterns of the pitch of 50 nm are formed. As shown in FIG. 3, an optical image is captured by scanning the inspection region 10 (whole inspection region) of the target object 101 for each of a plurality of inspection stripes 20 (an example of a stripe region) in a thin rectangular shape of the scan width, for example, in the Y direction. The width (scan width) of the inspection stripe 20 is a size sufficiently smaller than the vertical (y direction) size of the die 40. Further, the one inspection stripe 20 extends over the plurality of dies 40 in the horizontal direction (x direction). Thus, a stripe image captured in the one inspection stripe 20 contains images of the plurality of dies 40 in the same position. Therefore, frame images 30 of the plurality of dies 40 in the same position are cut out by cutting the stripe image in a predetermined width (for example, the same width as the scan width). In the example of FIG. 3, frame images 30a, 30b, 30c of the three dies 40, a die 1, a die 2, and a die 3 in the same position, are cut out.

Figure 4:
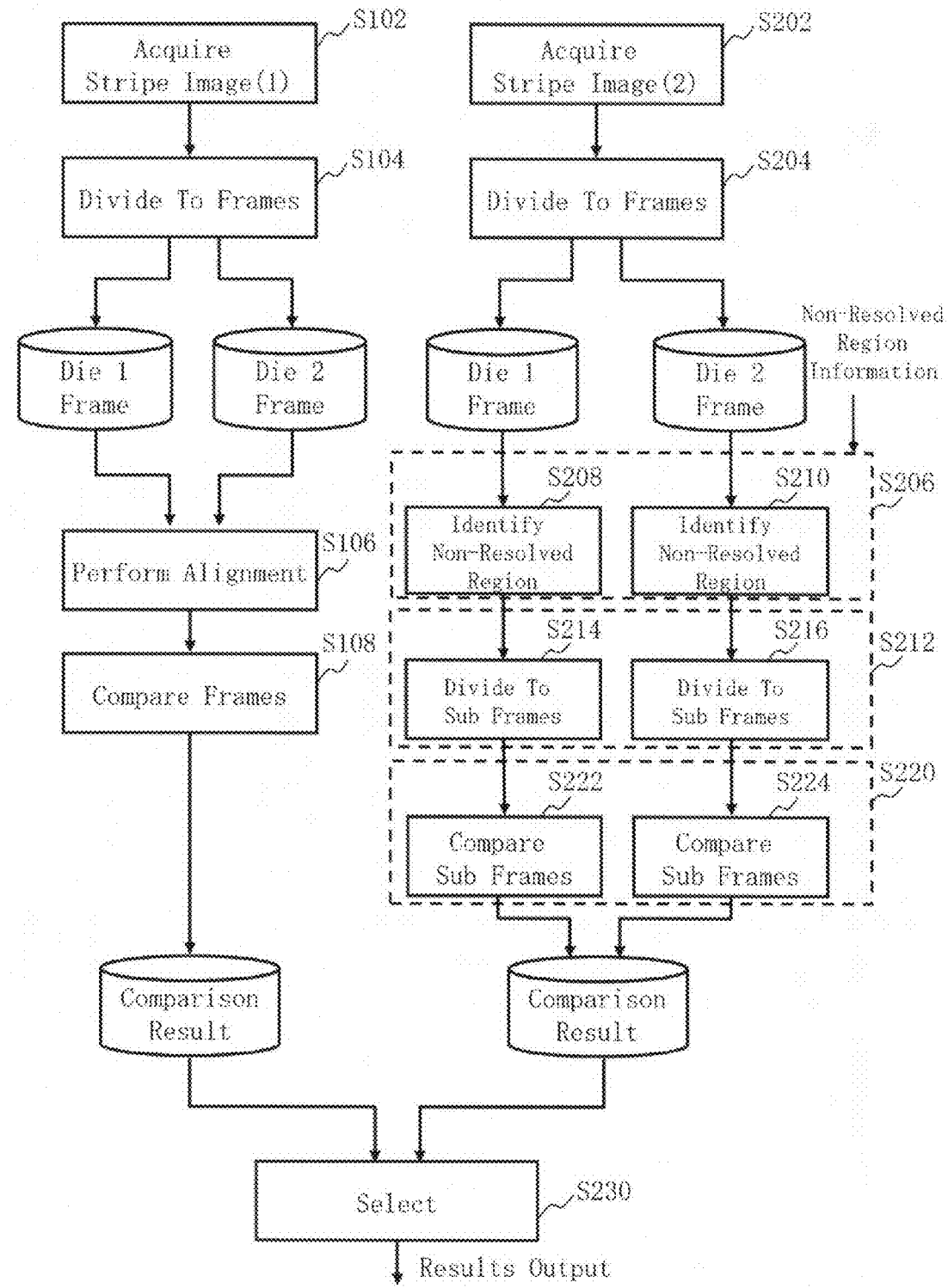
FIG. 4 is a flow chart showing principal processes of an inspection method according to Embodiment 1.

FIG. 4 is a flow chart showing principal processes of an inspection method according to Embodiment 1. In FIG. 4, an inspection method according to Embodiment 1 executes a series of processes including a stripe image acquisition (1) process (S102), a frame division process (S104), an alignment process (S106), a frame comparison process (S108), a stripe image acquisition (2) process (S202), a frame division process (S204), a non-resolved region identification process (S206), a subframe division process (S212), a subframe comparison process (S220), and a selection process (S230). In the non-resolved region identification process (S206), a non-resolved region identification process (S208) for each die and a non-resolved region identification process (S210) are executed as internal processes. In the subframe division process (S212), a subframe division process (S214) for each die and a subframe division process (S216) are executed as internal processes. In the subframe comparison process (S220), a subframe comparison process (S222) for each die and a subframe comparison process (S224) are executed as internal processes. While the three dies 40 are arranged in the x direction in FIG. 3, the two dies 40 arranged in the x direction will be used in FIG. 4 and subsequent figures in order to make an understanding of the description easier.

As the stripe image acquisition (1) process (S102), the optical image acquisition unit 150 acquires an optical image (second optical image) of the plurality of dies 40 of the target object 101 on which the plurality of dies 40 having the same pattern formed therein is arranged. A more specific operation is as described below.

The pattern formed on the target object 101 is irradiated with laser light (for example, DUV light) of a wavelength in the ultraviolet range or shorter to be inspection light from the appropriate light source 103 via the illumination optical system 170. The light having passed through the photomask 101 enters the photo diode array 105 (an example of a sensor) via the magnifying optical system 104 to form an optical image there. As the photo diode array 105, for example, a TDI (Time Delay Integration) sensor or the like can suitably be used.

Figure 5:
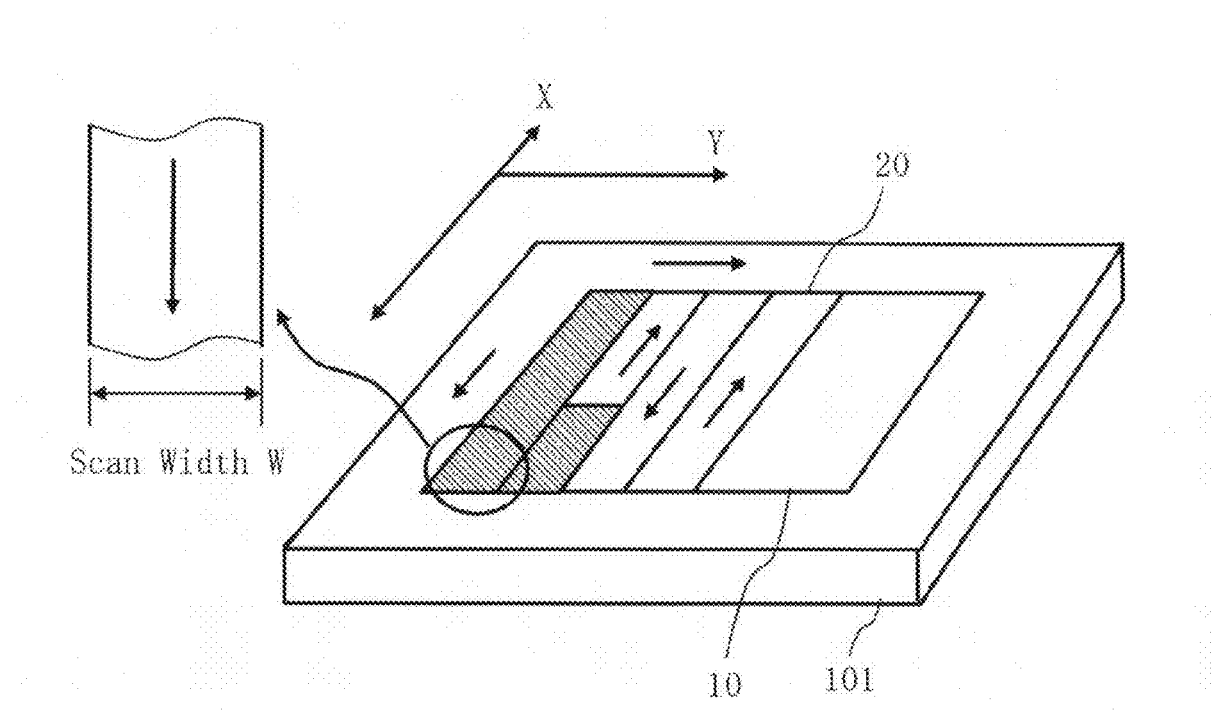
FIG. 5 is a conceptual diagram illustrating an inspection region in Embodiment 1.

FIG. 5 is a conceptual diagram illustrating an inspection region in Embodiment 1. As shown in FIG. 5, the inspection region 10 (whole inspection region) of the target object 101 is virtually divided into the plurality of inspection stripes 20 in a thin rectangular shape of a scan width W, for example, in the Y direction. The plurality of inspection stripes 20 is obtained by virtually dividing the inspection region 10 of the target object 101 to be inspected on which the plurality of dies 40 having the same pattern formed therein is arranged, in a thin rectangular shape so as to extend over the plurality of dies 40 in the x direction. Then, the inspection apparatus 100 acquires an image (stripe region image) for each of the inspection stripes 20. Laser light is used to capture for each of the inspection stripes 20 an image of a figure pattern arranged in the stripe region, in the longitudinal direction (X direction) of the stripe region. As the XYθ table 102 moves, an optical image is acquired while the photo diode array 105 continuously moves relatively in the X direction. The photo diode array 105 continuously captures an optical image of the scan width W as shown in FIG. 5. In other words, the photo diode array 105 as an example of the sensor captures an optical image of the plurality of dies 40 formed on the target object 101 by using inspection light while moving relatively with respect to the XYθ table 102. In Embodiment 1, after an optical image in the one inspection stripe 20 is captured, an optical image of the scan width W is similarly captured continuously by moving to the position of the next inspection stripe 20 in the Y direction, and then in the opposite direction. That is, image capturing is repeated in the forward (FWD)-backward (BWD) direction in which the direction of scanning is changed in the opposite direction each time.

Here, the direction of image capturing is not limited to the repetition of forward (FWD)-backward (BWD). Images may be captured in one direction. For example, FWD-FWD may be repeated. Alternatively, BWD-BWD may be repeated.

The image of a pattern formed on the photo diode array 105 is photoelectrically converted by each photoreceptor of the photo diode array 105 and further A/D (analog/digital) converted by the sensor circuit 106. Then, image data is stored in the stripe pattern memory 123 for each inspection stripe. When such image data (stripe region image) is obtained by capturing an image, a dynamic range in which a case where 100% of the amount of illumination light is incident is set as the maximum gray level is used as the dynamic range of the photo diode array 105. Subsequently, pixel data is sent to the comparator 108 together with data output from the position circuit 107 and indicating the position of the photomask 101 on the XYθ table 102. Measured data is, for example, unsigned 8-bit data and represents the gray level of brightness (amount of light) of each pixel. The stripe image output into the comparator 108 is stored in the memory 50.

As the frame division process (S104), the frame division unit 54 reads a stripe image from the memory 50 and divides the stripe region image into a plurality of frame images in a predetermined size (for example, the same width as the scan width W) in the x direction. For example, the stripe region image is divided into frame images of 512×512 pixels. Accordingly, separate frame images of the plurality of dies 40 captured in the same position are acquired. Such frame images are images captured in the standard dynamic range in which a case where 100% of the amount of illumination light is incident is set as the maximum gray level. Therefore, in such frame images, a non-resolved pattern has a value near a halftone as the pixel value. If, for example, the maximum gray level is 255, a value near 127 is shown. The plurality of divided frame images is stored in a memory for each of the corresponding dies 40. For example, frame images of the die 1 are stored in a memory 58*a*. Frame images of the die 2 are stored in a memory 58*b*.

As the alignment process (S106), the positioning unit 60 aligns the frame images 30 of the different dies 40. After rough alignment of image frames, high-precision alignment using patterns is performed. For example, alignment is performed in a unit of sub-pixel. Here, for example, a frame image of the die 1 and a frame image of the die 2 captured in the same position are aligned.

As the frame comparison process (S108), the frame comparison unit 68 (second comparison unit) compares pixel by pixel the aligned frame images 30 (optical images) of the different dies 40. Here, a pixel-by-pixel comparison is performed according to a predetermined algorithm to determine whether there is any defect. For example, a determination is made based on whether a difference of pixel values of frame images is within a threshold. Then, the results of comparison are output and stored in a memory 70*a*.

A die to die inspection is conducted in each process from the stripe image acquisition (1) process (S102) to the frame comparison process (S108) as described above. Next, a cell comparison inspection will be described.

As the stripe image acquisition (2) process (S202), the optical image acquisition unit 150 acquires an optical image (first optical image) of the plurality of dies 40 of the target object 101 to be inspected on which the plurality of dies 40 having the same pattern formed therein is arranged. The method of acquiring an optical image is the same as in the aforementioned stripe image acquisition (1) process (S102). In the stripe image acquisition (2) process (S202), however, when image data is obtained by capturing an image for each inspection stripe (stripe region image), a dynamic range (first dynamic range) in which a halftone portion of a dynamic range (second dynamic range) in which a gray level in a case that 100% of an amount of illumination light is incident is set as a maximum gray level is extended, is used as the dynamic range of the photo diode array 105. For example, a dynamic range in which the range of gray level values of 96 to 160 (an example of the halftone portion) in a case where 100% of the amount of illumination light is incident is set as the maximum gray level of 255 is extended to the gray levels of 0 to 255 is used. Accordingly, when the captured image is of a non-resolved pattern, arrangement irregularities (for example, turbulence of periodicity) and the like between non-resolved patterns can be made recognizable even if it is difficult to recognize the shape. Subsequently, pixel data (stripe region image) is sent to the comparator 108 together with data output from the position circuit 107 and indicating the position of the photomask 101 on the XYθ table 102. Measured data (stripe region image) is, for example, unsigned 8-bit data and represents the gray level of brightness (amount of light) of each pixel. The stripe region image output into the comparator 108 is stored in the memory 52.

As the frame division process (S204), the frame division unit 56 reads a stripe image from the memory 52 and divides the stripe region image into a plurality of frame images in a predetermined size (for example, the same width as the scan width W) in the x direction. For example, the stripe region image is divided into frame images of 512×512 pixels. Accordingly, separate frame images of the plurality of dies 40 captured in the same position are acquired. Such frame images are images captured in the extended dynamic range in which the halftone portion in a case where 100% of the amount of illumination light is incident is set as the maximum gray level is extended. The plurality of divided frame images is stored in a memory for each of the corresponding dies 40. For example, frame images of the die 1 are stored in a memory 58*c*. Frame images of the die 2 are stored in a memory 58*d*.

Figure 6:
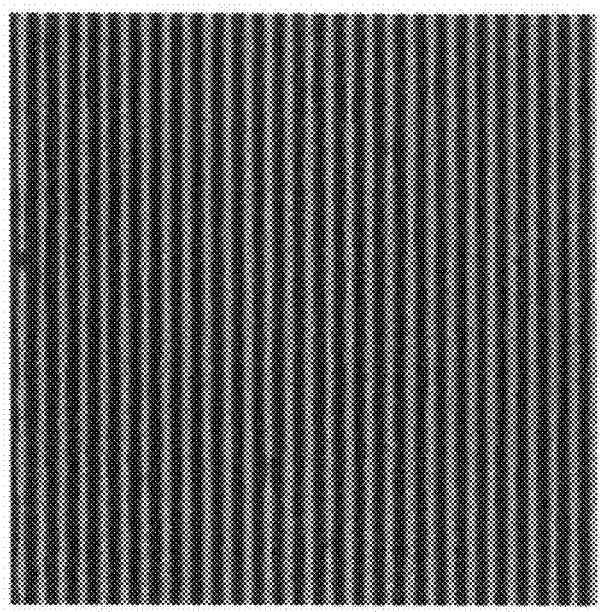
FIG. 6 is a diagram showing an example of a scanning electron microscope (SEM) image of a non-resolved pattern in Embodiment 1.

FIG. 6 is a diagram showing an example of a scanning electron microscope (SEM) image of a non-resolved pattern in Embodiment 1. In FIG. 6, a 1:1 line & space pattern of the pitch of, for example, 50 nm as a size of less than the resolution limit of the inspection apparatus 100 is shown. Thus, even if the pattern can be resolved by SEM using an electron beam, it is difficult for the inspection apparatus 100 using laser light to resolve the pattern. In a non-resolved pattern region, generally, cells including the same pattern repeatedly arranged as shown in FIG. 6 are frequently arranged. Thus, in Embodiment 1, as the cell comparison inspection, regarding such a non-resolved pattern region, instead of comparing frame images of different dies, subframe images in a frame image of the same die are compared to detect arrangement irregularities (for example, turbulence of periodicity) and the like between non-resolved patterns.

As the non-resolved region identification process (S206), the region identification unit 62 identifies non-resolved pattern regions for each of the frame images 30 by using non-resolved pattern region information capable of recognizing non-resolved pattern regions in which a non-resolved pattern that is not resolved is formed.

First, before starting the inspection, non-resolved pattern region information is input from outside in advance and stored in the magnetic disk drive 109 or the like. As the non-resolved pattern region information, for example, text data and figure pattern data can be used.

FIG. 7 is a diagram showing an example of non-resolved pattern region information including text data in Embodiment 1. In FIG. 7, region information 46 shows an example of non-resolved pattern region information including text data. In the region information 46, positions of regions such as a cell region, a lead wire region, a power supply region, and a dummy fill region are defined as text data. Among such regions, for example, the cell region becomes a non-resolved pattern region in which non-resolved patterns are arranged.

The other regions become peripheral regions of cells. Regarding the cell region, the cell number such as cell region 1 and cell region 2 and arrangement periods such as x, y coordinates, x, y sizes (lengths), and x, y pitches are defined.

As non-resolved pattern region information including figure pattern data, for example, rectangular figure pattern data shown in the cell region 42 of FIG. 3 is defined. In the figure pattern data, the figure code showing the type of the figure, a coordinate of a reference point such as the lower left corner of a rectangle, and x, y sizes of the figure are defined.

Figure 8:
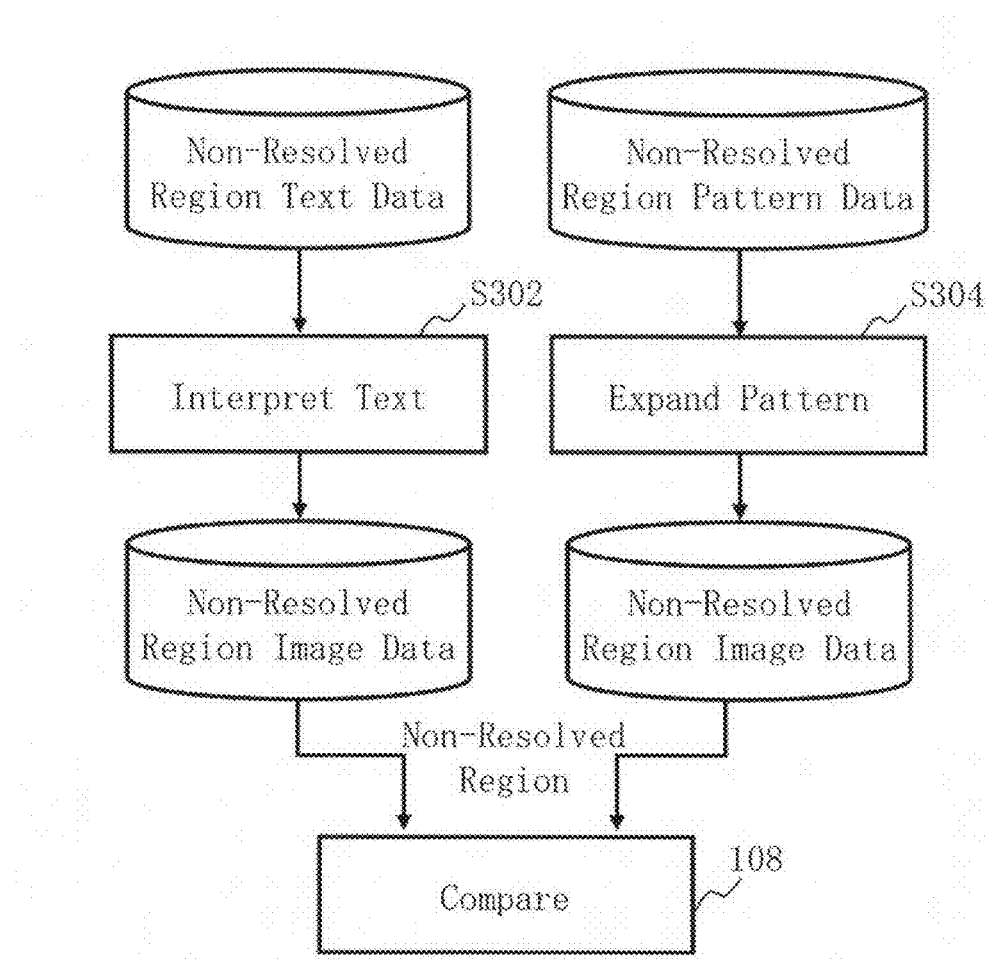
FIG. 8 is a flow chart showing internal processes of a non-resolved region identification process in Embodiment 1.

FIG. 8 is a flow chart showing internal processes of the non-resolved region identification process in Embodiment 1. In FIG. 8, the non-resolved region identification process (S206) executes at least one of a text interpretation process (S302) and a reference image generation process (S304). The inspection apparatus 100 is configured to be able to deal with both of the non-resolved pattern region information including text data and the non-resolved pattern region information including figure pattern data as described above to identify non-resolved pattern regions. If the input non-resolved pattern region information is text data, the text interpretation process (S302) is executed. If the input non-resolved pattern region information is figure pattern data, the reference image generation process (S304) is executed. Therefore, non-resolved pattern regions may be grasped by conforming to a data format of the input non-resolved pattern region information. However, Embodiment 1 is not limited to such a case and only one of the text interpretation process (S302) and the reference image generation process (S304) may be configured to be executable.

First, if the input non-resolved pattern region information is text data, non-resolved pattern region information including text data is input from outside the inspection apparatus 100 and stored in, for example, the magnetic disk drive 109.

As the text interpretation process (S302), the region management circuit 112 reads non-resolved pattern region information including text data from, for example, the magnetic disk drive 109 and interprets content of the text data. Then, the region management circuit 112 acquires a position coordinate (x, y) and size of the cell region 42 to be a non-resolved pattern region from the text data. If the cell regions 42 are arranged as an array, a position coordinate (x, y) and size of the first cell 1, a position coordinate (x, y) and size of the last cell 2, and x, y pitches are acquired. Then, information of the acquired non-resolved pattern region is output to the comparator 108.

Alternatively, if the input non-resolved pattern region information is figure pattern data, non-resolved pattern region information including figure pattern data is input from outside the inspection apparatus 100 and stored in, for example, the magnetic disk drive 109.

As the reference image generation process (S304), the reference image generation circuit 111 reads non-resolved pattern region information including figure pattern data from the magnetic disk drive 109 through the control computer 110. Then, the reference image generation circuit 111 generates and converts the read figure pattern data into binary or multivalued image data to create non-resolved pattern region image data (non-resolved pattern region image). The non-resolved pattern region image data is, for example, unsigned 8-bit data for each pixel and represents the gray level of brightness (amount of light) of each pixel. The non-resolved pattern region image data is sent to the comparator 108.

Then, the region identification unit 62 inside the comparator 108 uses the input non-resolved pattern region information to identify non-resolved pattern regions in the frame images 30 for each of the frame images.

As the non-resolved region identification process (S208), the region identification unit 62 uses the non-resolved pattern region information to identify non-resolved pattern regions for each of the frame images 30 obtained from the die 1. Further, as the non-resolved region identification process (S210), the region identification unit 62 uses the non-resolved pattern region information to identify non-resolved pattern regions for each of the frame images 30 obtained from the die 2.

As the method of identification, the region identification unit 62 identifies a corresponding region in the target frame from the position, size and the like of the non-resolved pattern region information. Alternatively, the region identification unit 62 uses non-resolved pattern region image data to first identify a corresponding region in the target frame image from the position, size and the like of the non-resolved pattern region information. Then, the region identification unit 62 identifies a corresponding region in the target frame. Alternatively, the region identification unit 62 may use non-resolved pattern region image data to first identify pixels to be a frame (side) of a non-resolved pattern region for each pixel of the target frame image and then to identify a region surrounded by the pixels to be a frame (side) as a non-resolved pattern region. In Embodiment 1, as described above, non-resolved pattern region information is used to recognize and identify a non-resolved pattern region in which a non-resolved pattern that is not resolved is formed.

As the subframe division process (S212), the subframe division unit 64 uses non-resolved pattern region information to divide an optical image of a die positioned in a non-resolved pattern region into a plurality of sub-optical images. The subframe division unit 64 is an example of a division unit. More specifically, the subframe division unit 64 divides, among a plurality of frame images, frame images whose non-resolved pattern regions are identified into a plurality of subframe images.

As the subframe division process (S214), the subframe division unit 64 divides, among a plurality of frame images obtained from the die 1, frame images whose non-resolved pattern regions are identified into a plurality of subframe image. Further, as the subframe division process (S216), the subframe division unit 64 divides, among a plurality of frame images obtained from the die 2, frame images whose non-resolved pattern regions are identified into a plurality of subframe image.

Figure 9:
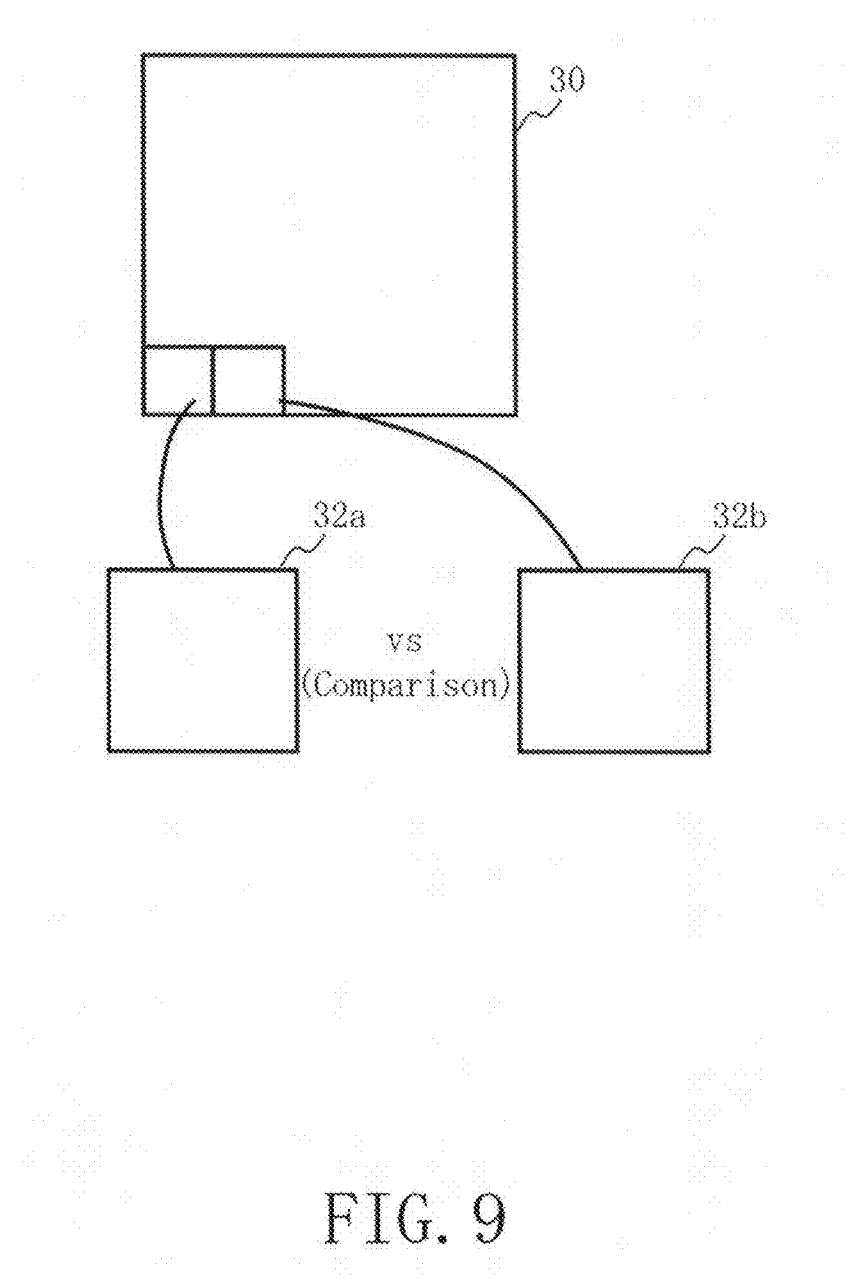
FIG. 9 is a diagram illustrating a method of subframe division in Embodiment 1.

FIG. 9 is a diagram illustrating a method of subframe division in Embodiment 1. In FIG. 9, each of the frame images 30 whose non-resolved pattern regions are identified is divided into a plurality of subframe images 32 in a predetermined size. For example, the frame image 30 is divided into subframe images of 32×32 pixels. Accordingly, the plurality of subframe images 32 arranged in order is acquired from the frame images 30 captured from the same die 40. The subframe images 32 are images captured in the extended dynamic range in which the halftone portion in a case where 100% of the amount of illumination light is incident is set as the maximum gray level is extended.

As the subframe comparison process (S220), the subframe comparison unit 66 (first comparison unit) compares, regarding a non-resolved pattern region, a plurality of sub-optical images divided from optical images of the same die pixel by pixel. In other words, the subframe comparison unit 66 compares the plurality of subframe images 32 divided from the same frame image according to a predetermined algorithm pixel by pixel to determine whether there is turbulence of periodicity. The comparison results are stored in a memory 70b.

As the subframe comparison process (S222), the subframe comparison unit 66 compares the plurality of subframe images 32 divided from the same frame image of the die 1 pixel by pixel. As the subframe comparison process (S224), the subframe comparison unit 66 compares the plurality of subframe images 32 divided from the same frame image of the die 2 pixel by pixel. Note that when frame images of different dies are compared, frame images are aligned with high precision by using patterns, but when the plurality of subframe images 32 divided from the same frame is compared, alignment using patterns is not needed. Rough alignment of image frames is enough when alignment is performed.

Figure 10A:
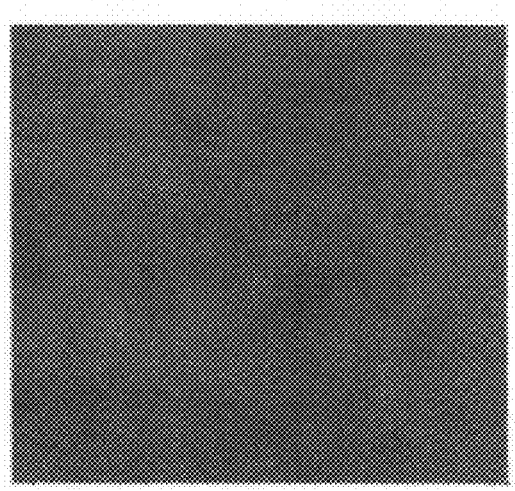
FIGS. 10A and 10B are diagrams showing examples of subframe images in Embodiment 1.
Figure 10B:
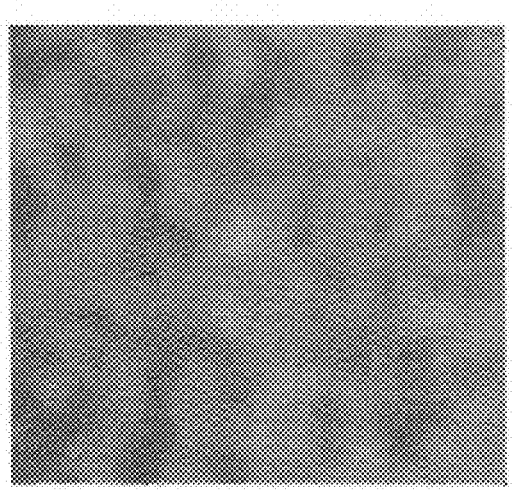

FIGS. 10A and 10B are diagrams showing examples of subframe images in Embodiment 1. FIGS. 10A and 10B both show subframe images divided from the same frame image. Since an image of a pattern region of less than the resolution limit is captured by the inspection apparatus 100, as shown in FIGS. 10A and 10B, it is difficult to recognize pattern edges and the like even if an image of the pattern region is captured by a sensor using a dynamic range in which the halftone portion is extended. However, it is evident that when compared with the image in FIG. 10A, the image in FIG. 10B is slightly white in the center portion of the image.

Figure 11A:
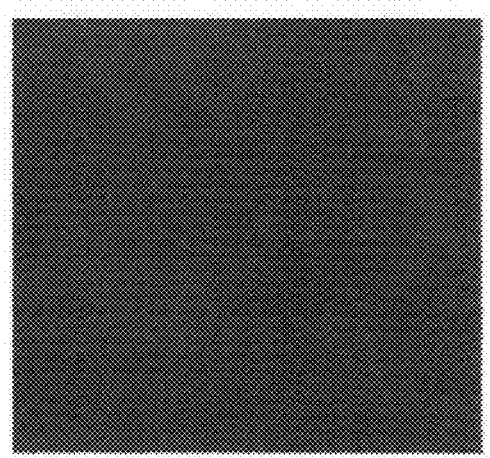
FIGS. 11A and 11B are diagrams showing examples of pseudocolor images of subframe images in Embodiment 1.
Figure 11B:
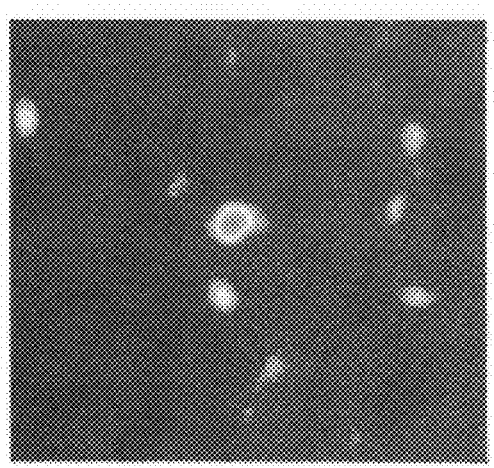

FIGS. 11A and 11B are diagrams showing examples of pseudocolor images of subframe images in Embodiment 1. FIG. 11A is a diagram obtained by performing pseudocolor application processing on the subframe image in FIG. 10A. FIG. 11B is a diagram obtained by performing pseudocolor application processing on the subframe image in FIG. 10B. Though FIGS. 11A and 11B are not shown in color because of the drawings for patent application, a case where, for example, blue is set to gray level values of 0 to 63, yellow is set to gray level values of 64 to 127, orange is set to gray level values of 128 to 199, and red is set to gray level values of 192 to 255 is shown. When each gray level range is color-coded in this manner, a color difference is hardly distinguished in the image in FIG. 11A, but it is evident that regions of different colors are scattered in the image in FIG. 11B. Therefore, it is evident from the image in FIG. 11B that there is turbulence of periodicity of a non-resolved pattern, for example, a line & space pattern in a size of less than the resolution limit. The subframe comparison unit 66 determines a pixel portion in which only one of target subframe images as shown, for example, in FIGS. 11A and 11B, exhibits a gray level value deviating from a predetermined gray level range as a periodicity defect.

Figure 12A:
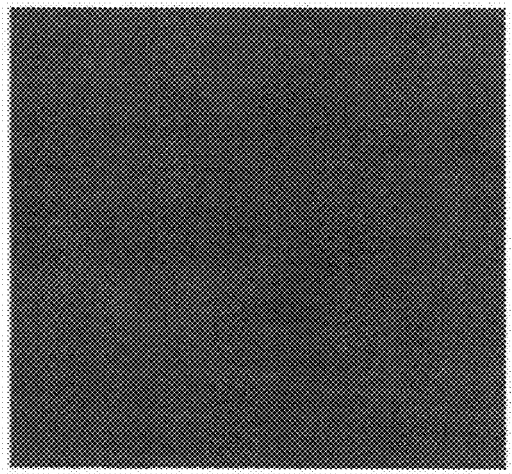
FIGS. 12A and 12B are diagrams showing examples of images obtained by performing shade emphasizing conversion processing on subframe images in Embodiment 1.
Figure 12B:
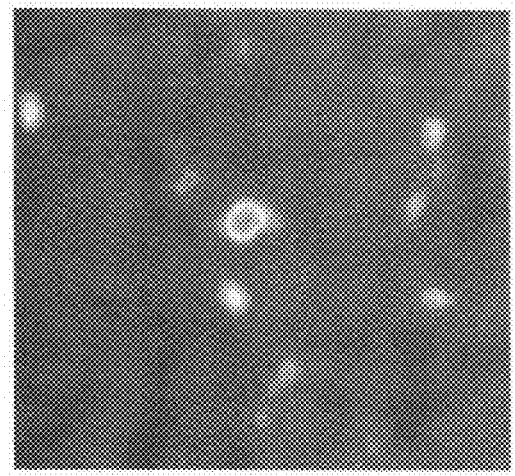

FIGS. 12A and 12B are diagrams showing examples of images obtained by performing shade emphasizing conversion processing on subframe images in Embodiment 1. FIG. 12A is a diagram obtained by performing shade emphasizing conversion processing on the subframe image in FIG. 10A. FIG. 12B is a diagram obtained by performing shade emphasizing conversion processing on the subframe image in FIG. 10B. In addition to pseudocolor images, it is also possible to recognize by performing shade emphasizing conversion processing that there is turbulence of periodicity of a non-resolved pattern, for example, a line & space pattern in a size of less than the resolution limit.

Figure 13:
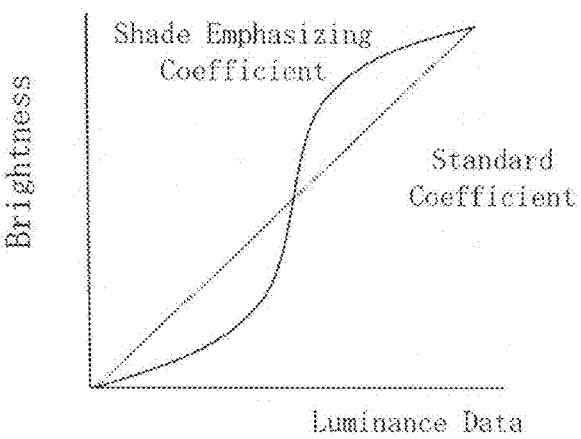
FIG. 13 is a graph illustrating a shade emphasizing coefficient in Embodiment 1.

FIG. 13 is a graph illustrating a shade emphasizing coefficient in Embodiment 1. In FIG. 13, the vertical axis represents brightness and the horizontal axis represents luminance data. As shown in FIG. 13, while brightness is linearly proportional to the value of luminance data in general, as shown in FIGS. 12A and 12B, a difference between brightness and luminance data can be made easier to recognize by performing conversion processing of the correspondence between luminance data and brightness using a coefficient whose degree of change is large in the intermediate luminance in Embodiment 1.

As the selection process (S230), the selection unit 72 selects results of subframe comparison (cell comparison inspection) when the target pixel is positioned in a non-resolved pattern region. The selection unit 72 selects results of frame comparison (die to die comparison inspection) when the target pixel is positioned in a region that is not a non-resolved pattern region. The selected inspection results are output to, for example, the magnetic disk drive 109, the magnetic tape drive 115, the FD 116, the CRT 117, the pattern monitor 118, or the printer 119. Alternatively, the results may be output to the outside.

Regardless of the results of the selection process (S230), the results of frame comparison (die to die comparison inspection) and the results of subframe comparison (cell comparison inspection) may be output to the magnetic disk drive 109, the magnetic tape drive 115, the FD 116, the CRT 117, the pattern monitor 118, or the printer 119. Alternatively, the results may be output to the outside. Accordingly, regarding a place determined to be defective by one comparison, the results of the other comparison can be checked.

According to Embodiment 1, as described above, an inspection of fine patterns of less than the resolution limit and an inspection of pattern defects in a size that can sufficiently be resolved can be conducted. Therefore, a high-precision inspection in accordance with the necessary precision can be conducted.

Embodiment 2

In Embodiment 1, a case where an optical image for die to die comparison inspection and an optical image for cell comparison inspection are captured separately is described, but embodiments are not limited to such a case. In Embodiment 2, a case where the same image is used for both comparisons will be described. An apparatus configuration in Embodiment 2 is the same as in FIGS. 1 and 2.

Figure 14:
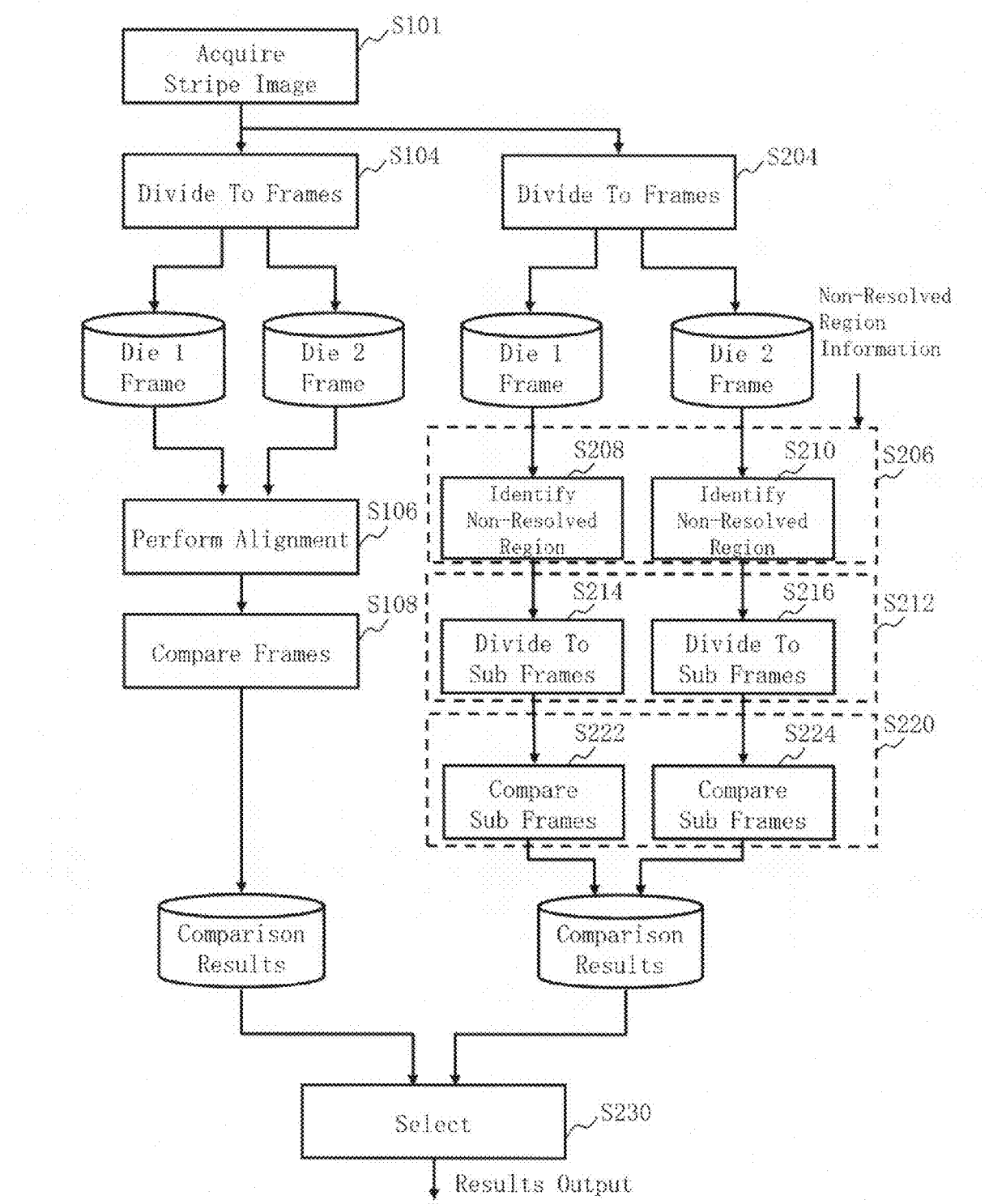
FIG. 14 is a flow chart showing principal processes of an inspection method according to Embodiment 2.

FIG. 14 is a flow chart showing principal processes of an inspection method according to Embodiment 2. FIG. 14 is the same as FIG. 4 except that the inspection method in Embodiment 2 executes, instead of the stripe image acquisition (1) process (S102) and the stripe image acquisition (2) process (S202), a stripe image acquisition process (S101). If not specifically described below, Embodiment 2 is the same as Embodiment 1.

As the stripe image acquisition process (S101), an optical image acquisition unit 150 acquires an optical image (first optical image) of a plurality of dies 40 of a target object 101 to be inspected on which the plurality of dies 40 having the same pattern formed therein is arranged. The method of acquiring an optical image is the same as in the stripe image acquisition (1) process (S102) or the stripe image acquisition (2) process (S202) in Embodiment 1. In the stripe image acquisition process (S101), however, when image data is obtained by capturing an image for each inspection stripe (stripe region image), a dynamic range in which a halftone portion in a case where 100% of the amount of illumination light is incident is set as the maximum gray level is extended is used as the dynamic range of the photo diode array 105. For example, a dynamic range in which the range of gray level values of 64 to 191 (an example of the halftone portion) in a case where 100% of the amount of illumination light is incident is set as the maximum gray level of 255 is extended to the gray levels of 0 to 255 is used. Accordingly, when the captured image is of a non-resolved pattern, arrangement irregularities (for example, turbulence of periodicity) and the like between non-resolved patterns can be made recognizable even if it is difficult to recognize the shape. On the other hand, when the captured image is of a resolvable pattern, the pattern diverges if the amount of light exceeding the maximum gray level (here, corresponding to, for example, a gray level value of 191 in a case where 100% of the amount of illumination light is incident) is incident and the entire pattern has the maximum gray level of 255 and the pattern diverges if the amount of light below the minimum gray level (here, corresponding to, for example, a gray level value of 64 in a case where 100% of the amount of illumination light is incident) is incident and the entire pattern has the minimum gray level of 0. However, the precision of inspection of, for example, a peripheral pattern that can be resolved may often be low. Therefore, a die to die comparison inspection may be conducted by using images of such a dynamic range depending on the necessary precision. The range of the halftone portion to be extended may be set to an optimum range based on experiments or the like.

Subsequently, the pixel data (stripe region image) is sent to a comparator 108 together with data output from a position circuit 107 and indicating the position of a photomask 101 on an XYθ table 102. Measured data is, for example, unsigned 8-bit data and represents the gray level of brightness (amount of light) of each pixel. The stripe region image output into the comparator 108 is stored in, for example, a memory 52.

In a frame division process (S104) for die to die comparison inspection, the stripe region image stored in the memory 52 may be divided into a plurality of frame images. Also in a frame division process (S204) for cell comparison inspection, the stripe region image stored in the memory 52 may be divided into a plurality of frame images. Hereinafter, content in each process is the same as in Embodiment 1.

According to Embodiment 2, as described above, in addition to the effect of Embodiment 1, the number of operations for acquiring optical images can further be reduced to one operation (one round). Therefore, the scan time can be reduced and the inspection time can be reduced correspondingly.

In the above description, a " . . . circuit" or a " . . . process" can be configured by hardware such as an electronic circuit. Alternatively, such a " . . . circuit" or a " . . . process" can be configured by a program that can be operated on a computer. Alternatively, such a " . . . circuit" or a " . . . process" may be implemented not only by a program to be software, but also by a combination of hardware and software, or in a combination with firmware. When configured by a program, the program is recorded in a record carrier body storing therein a processing procedure in a computer readable and executable form such as a magnetic disk drive, a magnetic tape drive, an FD, or an ROM (Read Only Memory). For example, the table control circuit 114, the reference image generation circuit 111, the region management circuit 112, and the comparator 108 constituting an operation controller may be configured by an electric circuit or may be realized by software that can be processed by the control computer 110. Further, such circuits may be realized by combining an electric circuit and software.

In the foregoing, the embodiments have been described with reference to concrete examples. However, the present invention is not limited to such concrete examples. In the embodiments, for example, a transmissive illumination optical system using transmitted light is shown as the illumination optical system 170, but is not limited thereto. For example, a reflective illumination optical system using reflected light may be used. Alternatively, transmitted light and reflected light may be used simultaneously by combining a transmissive illumination optical system and a reflective illumination optical system. Also in the embodiments, the die to die inspection and the cell comparison inspection that compare measured data are conducted, but the inspection is not limited thereto. Instead of the die to die inspection, a die to database inspection that compares measured data and a reference image created from design data may be conducted.

Parts of the apparatus configuration, the control method, and the like which are not needed to be explained directly for the explanation of the present invention are not described. However, a necessary apparatus configuration and a necessary control method can be appropriately selected and used. For example, the configuration of a control unit that controls the inspection apparatus 100 is not described, but it is needless to say that a necessary control unit configuration is appropriately selected and used.

In addition, all pattern inspection apparatuses and pattern inspection methods including the elements of the present invention and whose design can appropriately be altered by those skilled in the art are included in the scope of the present invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern inspection apparatus comprising:
  an optical image acquisition unit including an illumination optical system, a table, a magnifying optical system, and a sensor, and configured to acquire a plurality of optical images regarding a plurality of dies of a target object to be inspected on which the plurality of dies having a same pattern formed therein is arranged;
  a sub-optical image division unit configured by a circuit or a computer, to divide an optical image of the plurality of optical images regarding a die of the plurality of dies positioned in a non-resolved pattern region into a plurality of sub-optical images using non-resolved pattern region information for recognizing the non-resolved pattern region in which a non-resolved pattern that is not resolved is formed;
  a first comparison unit configured by a circuit or the computer, to compare the plurality of sub-optical images divided from the optical image of the same die regarding the non-resolved pattern region pixel by pixel; and
  a second comparison unit configured by a circuit or the computer, to compare optical images of the plurality of optical images regarding different dies of the plurality of dies pixel by pixel.

2. The apparatus according to claim 1, wherein one of text data and figure pattern data is used as the non-resolved pattern region information.

3. The apparatus according to claim 1, wherein the optical image acquisition unit includes the sensor capturing an image, and
  the sensor captures first optical images of the plurality of dies using a first dynamic range in which a halftone portion of a second dynamic range in which a gray level in a case that 100% of an amount of illumination light is incident is set as a maximum gray level is extended.

4. The apparatus according to claim 3, wherein the sensor further captures second optical images of the plurality of dies using the second dynamic range in which a gray level in a case that 100% of the amount of illumination light is incident is set as the maximum gray level.

5. The apparatus according to claim 1, wherein the optical image acquisition unit acquires a stripe region image for each of a plurality of stripe regions obtained by virtually dividing an inspection region of the target object to be inspected in a thin rectangular shape so as to extend over the plurality of dies.

6. The apparatus according to claim 5, further comprising: a frame division unit configured by a circuit or the computer, to divide the stripe region image into a plurality of frame images in a predetermined size.

7. The apparatus according to claim 6, further comprising: a non-resolved region identification unit configured by a circuit or the computer, to identify the non-resolved pattern region for each of the plurality of frame images using the non-resolved pattern region information capable of recognizing the non-resolved pattern region in which the non-resolved pattern that is not resolved is formed.

8. The apparatus according to claim 7, wherein the sub-optical image division unit divides, among the plurality of frame images, a frame image in which the non-resolved pattern region is identified into a plurality of subframe images to be the plurality of sub-optical images.

9. A pattern inspection method comprising:
acquiring a plurality of optical images regarding a plurality of dies of a target object to be inspected on which the plurality of dies having a same pattern formed therein is arranged;
dividing an optical image of the plurality of optical images regarding a die of the plurality of dies positioned in a non-resolved pattern region into a plurality of sub-optical images using non-resolved pattern region information capable of for recognizing the non-resolved pattern region in which a non-resolved pattern that is not resolved is formed;
comparing the plurality of sub-optical images divided from the optical images of the same die regarding the non-resolved pattern region pixel by pixel; and
comparing optical images of the plurality of optical images regarding different dies of the plurality of dies pixel by pixel.

10. The method according to claim 9, further comprising: acquiring a stripe region image for each of a plurality of stripe regions obtained by virtually dividing an inspection region of the target object to be inspected in a thin rectangular shape so as to extend over the plurality of dies.

11. The method according to claim 10, further comprising: dividing the stripe region image into a plurality of frame images in a predetermined size to be the optical images of the plurality of dies.

12. The method according to claim 11, further comprising:
identifying the non-resolved pattern region for each of the plurality of frame images using the non-resolved pattern region information.

13. A pattern inspection method comprising:
acquiring a stripe region image for each of a plurality of stripe regions obtained by virtually dividing an inspection region of a target object to be inspected on which a plurality of dies having a same pattern formed therein is arranged in a thin rectangular shape so as to extend over the plurality of dies;
dividing the stripe region image into a plurality of frame images in a predetermined size;
identifying a non-resolved pattern region for each of the plurality of frame images using non-resolved pattern region information for recognizing the non-resolved pattern region in which a non-resolved pattern that is not resolved is formed;
dividing, among the plurality of frame images, a frame image in which the non-resolved pattern region is identified into a plurality of subframe images;
comparing the plurality of subframe images divided from the same frame image pixel by pixel;
aligning frame images of the plurality of frame images regarding different dies of the plurality of dies; and
comparing the frame images aligned regarding the different dies pixel by pixel.

* * * * *